Figure 1:
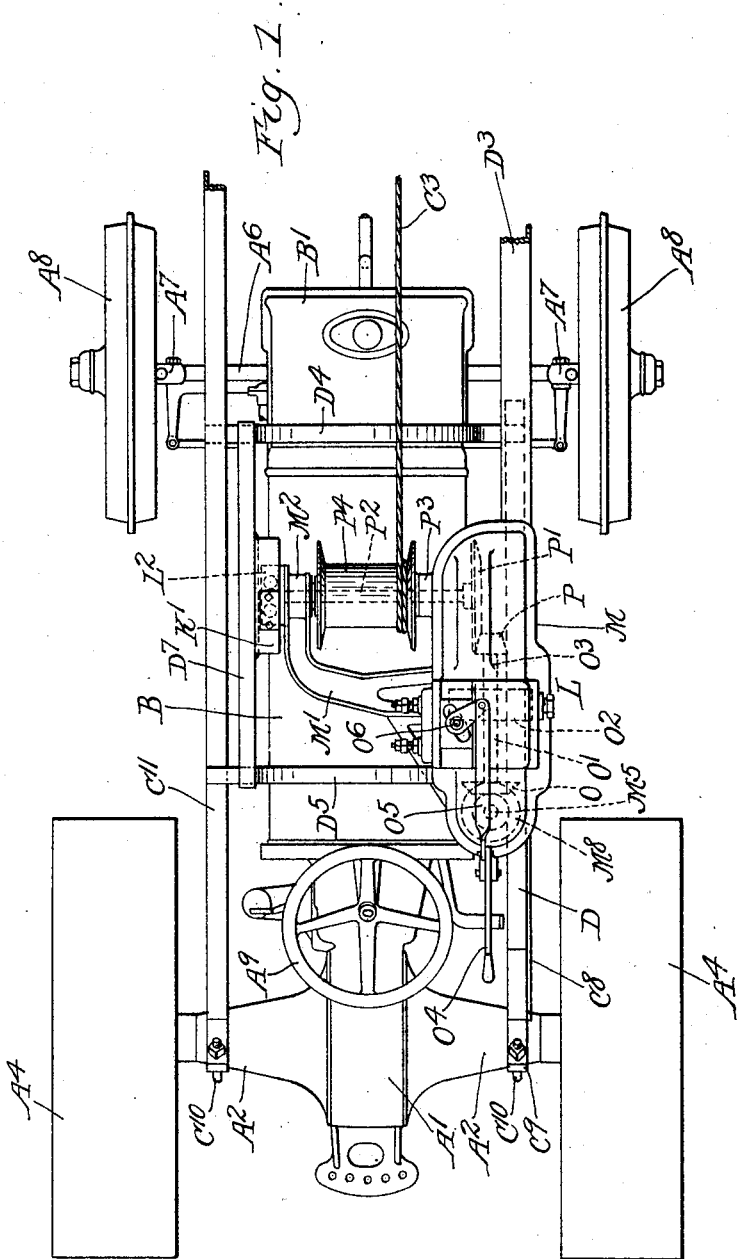

Jan. 29, 1929.  1,700,191
W. C. ANTHONY ET AL
WINCH MECHANISM
Filed July 10, 1926  4 Sheets-Sheet 1

Inventors
William C. Anthony
Charles H. Benedict
by Parker + Carter
Attorneys.

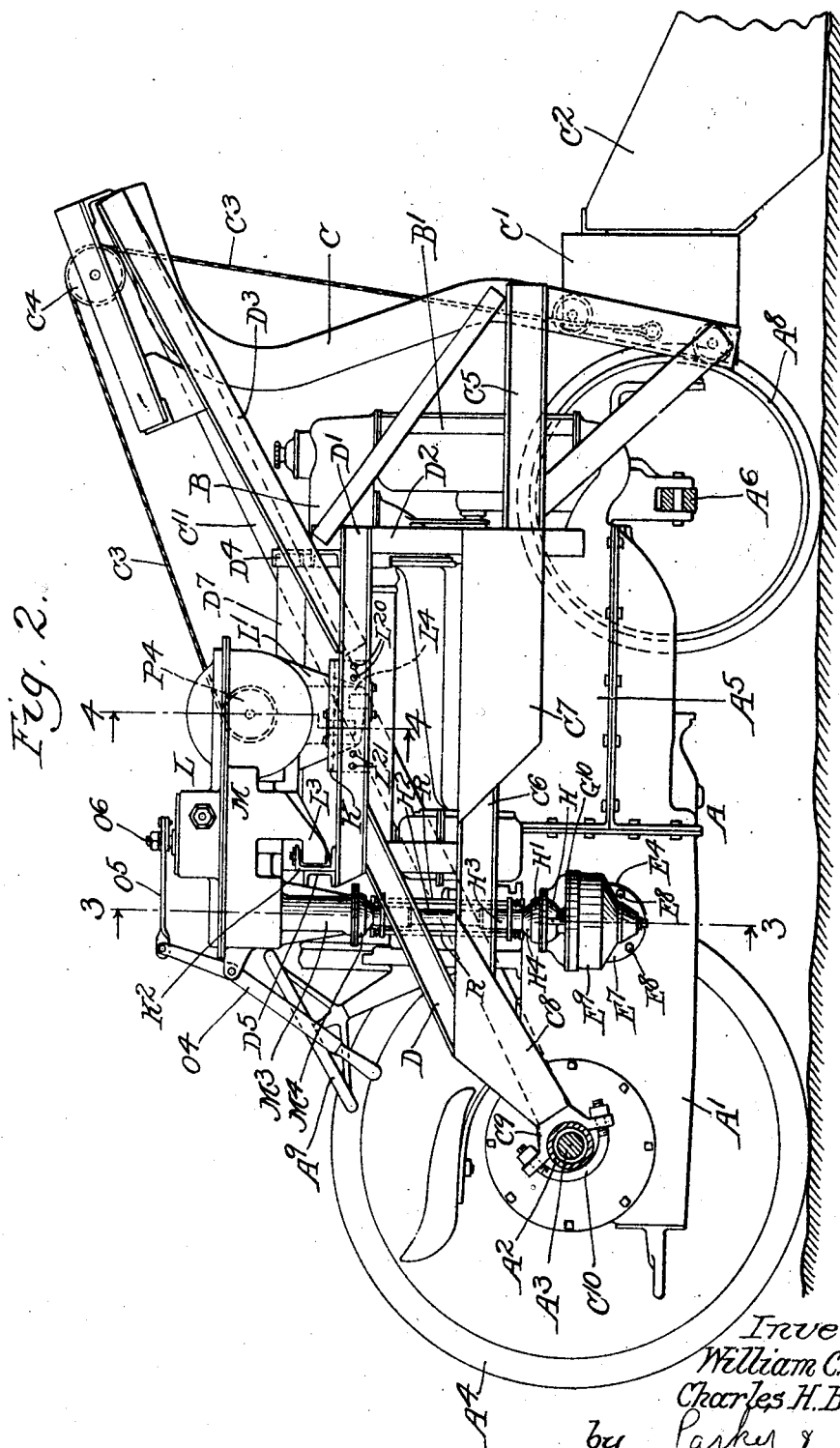

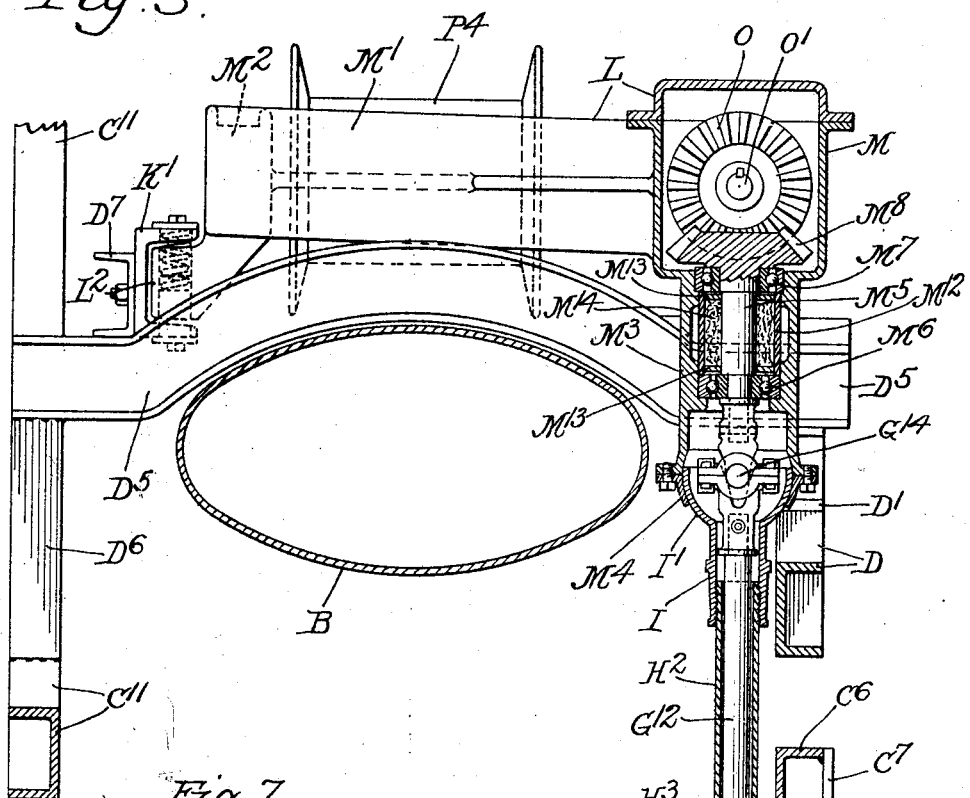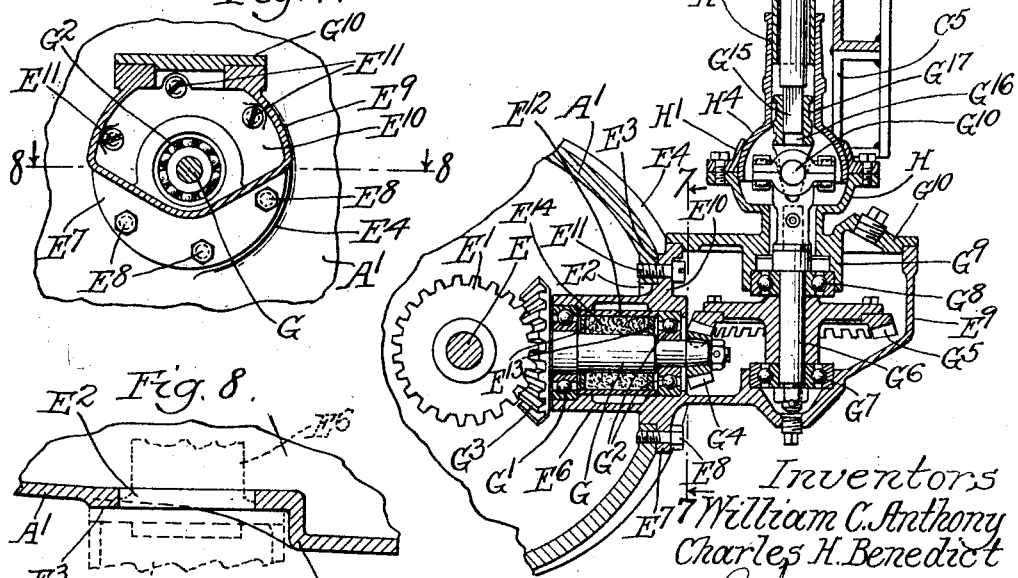

Jan. 29, 1929.                          1,700,191
W. C. ANTHONY ET AL
WINCH MECHANISM
Filed July 10, 1926          4 Sheets-Sheet 4
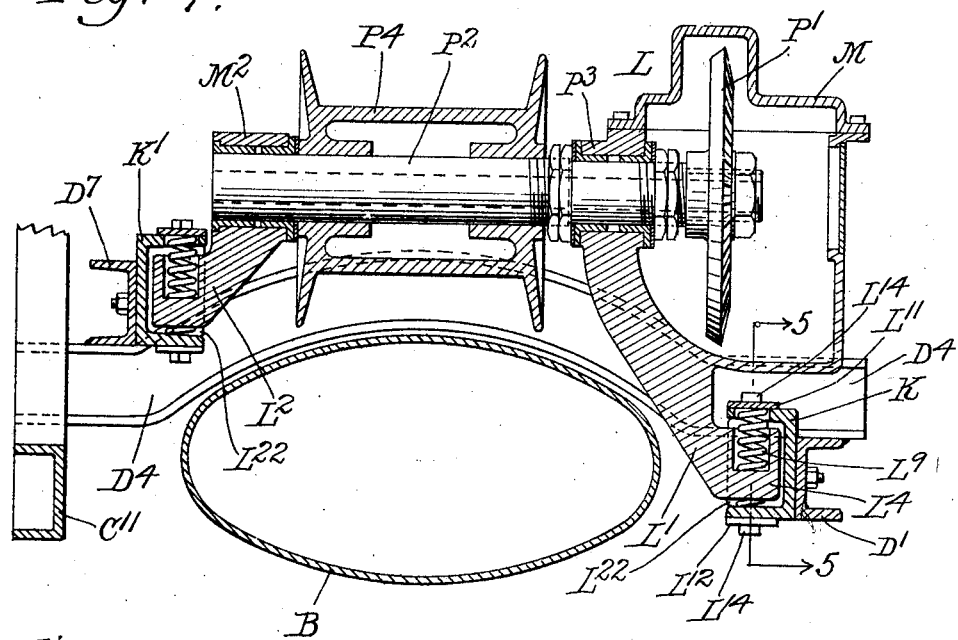
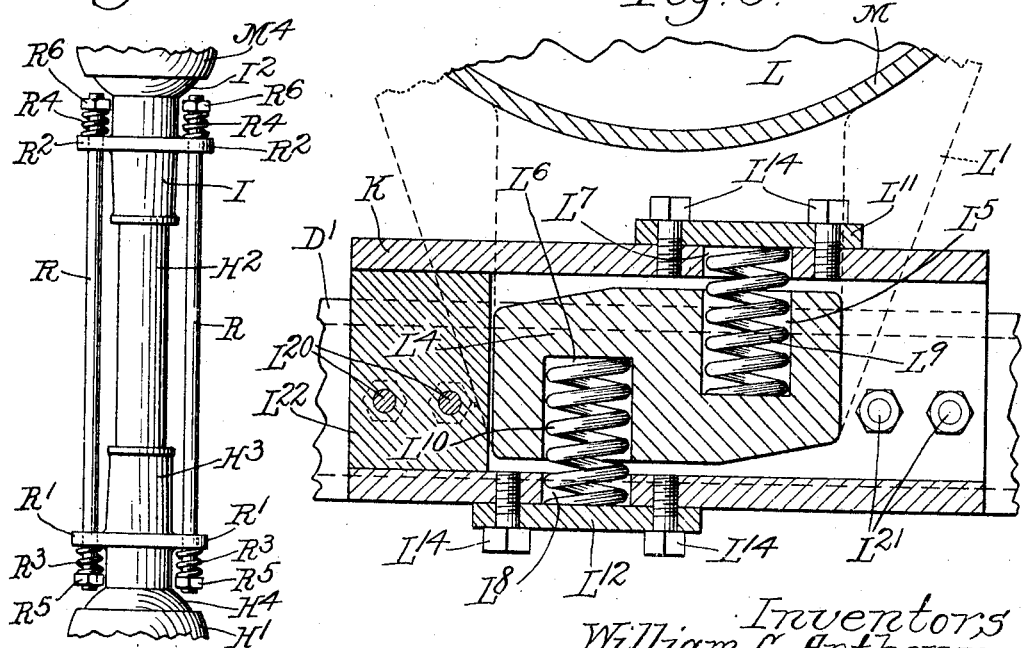
Inventors
William C. Anthony
Charles H. Benedict
by Parker & Carter
Attorneys.

Patented Jan. 29, 1929.

1,700,191

UNITED STATES PATENT OFFICE.

WILLIAM C. ANTHONY AND CHARLES H. BENEDICT, OF STREATOR, ILLINOIS, ASSIGNORS TO ANTHONY COMPANY, OF STREATOR, ILLINOIS, A CORPORATION OF ILLINOIS.

WINCH MECHANISM.

Application filed July 10, 1926. Serial No. 121,544.

This invention relates to an elevating shovel, and particularly to actuating means for a shovel of the type which is adapted to be mounted on a self-propelled vehicle, for example a tractor. As herein illustrated it is so mounted, and is driven from the tractor power plant. One object of the invention is to provide a shovel assembly and means for actuating it. Another object is the provision of a driving connection between tractor and shovel. Another object is the provision of such a driving connection which shall be unaffected by the normal variations in relative position of shovel and tractor and of the shovel carrying and guiding frame and the tractor. Another object is the provision of improved means for securing a driving connection to the body or frame of the tractor. Another object is the provision of a flexible or yieldable mounting for the winch mechanism. Other objects will appear from time to time in the course of the specification and claims.

We illustrate our invention more or less diagrammatically in the accompanying drawings, wherein—

Figure 1 is a plan view;
Figure 2 is a side elevation;
Figure 3 is a section on the line 3—3 of Figure 2;
Figure 4 is a section on the line 4—4 of Figure 2;
Figure 5 is a section on the line 5—5 of Figure 4;
Figure 6 is a detail on an enlarged scale;
Figure 7 is a detail section on the line 7—7 of Figure 3; and
Figure 8 is a detail section on the line 8—8 of Figure 7, the parts being shown by dotted lines.

Like parts are indicated by like symbols throughout the specification and drawings.

A generally indicates the frame or body of an engine or tractor which comprises, for example, a rear portion $A^1$ having the outwardly projecting shaft housing member $A^2$ through which passes the shaft $A^3$, to the outer ends of which are secured the rear drive wheels $A^4$, $A^5$ generally indicates the forward portion of the tractor frame or body, to which is secured the forward axle $A^6$ upon which are mounted the steering knuckles $A^7$ controlling the forward wheels $A^8$ and responsive in any suitable manner to rotation of the steering wheel $A^9$. The details of the steering connection form no part of the present invention. It will be understood that any suitable power plant, the details of which are not herein shown is housed within the tractor body.

Positioned above the body or frame A, and supported upon it in any suitable manner, is the tank B, in communication with the radiator $B^1$, the details thereof forming no part of the present invention. Mounted on the frame or body A is any suitable shovel mounting and supporting structure, the details of which form no part of the present invention, but which may comprise for example the forward track members C which are adapted to guide the bucket supporting carriage $C^1$ upon which is mounted the bucket $C^2$. $C^3$ is any suitable hoist cable passing around the sheave $C^4$ and extending to the hoisting means later to be described. The track C is supported upon the body A by any suitable means, for example by the longitudinal frame members $C^5$, $C^6$, which are connected for example by the plates $C^7$. The plate $C^8$ extends downwardly and rearwardly from the rear end of the frame member $C^6$, to the lower end of which is secured a stirrup $C^9$ resting upon one of the housing members $A^2$ and secured to it for example by the U-bolt $C^{10}$. $C^{11}$ is a longitudinal frame member at the opposite side of the tractor, similarly secured at its lower end to the opposite housing member $A^2$. Connected to the described horizontal supports upwardly projecting from the plate $C^8$ is the upwardly inclined diagonal support D, to the upper end of which is secured the second horizontal support, the channel iron $D^1$. The forward end of the channel iron $D^1$ is supported on a vertical frame member $D^2$ which extends downwardly to the plate $C^7$ and the frame member $C^5$. Upwardly and forwardly inclined from the channel $D^1$ is the frame member $D^3$ which supports the upper end of one of the tracks C. It will be understood that the member $C^{11}$ extends diagonally upwardly from the housing member $A^2$, which it engages at its rear end, to the top of the other track C. The frame is braced, for example by the transverse members $D^4$ $D^5$, which are upwardly bowed to clear the tank B. Both cross pieces are, as shown in Figures 3 and 4, supported at their right end, as shown in the figures, upon the horizontal frame member $D^1$. $D^5$ is supported, at its opposite end, upon the vertical frame member $D^6$ which extends downwardly to and is supported upon the diagonal $C^{11}$. The left end of the forward cross member $D^4$ engages and is secured to the diagonal $C^{11}$. $D^7$ is a horizontal channel member mounted upon the left ends of the cross members $D^4$ $D^5$.

Figures 2 and 3 illustrate the driving connection with the tractor power plant. The tractor engine forms no part of the present invention and is not shown in detail but the present device is shown, for illustrative purpose, in connection with a Fordson tractor structure. E, in Figure 3, indicates the transmission drive shaft, upon which is keyed the bevel gear $E^1$. The housing member $A^1$ is shown as apertured as at $E^2$, as in the normal Fordson practice. The aperture is surrounded for example by the ledge $E^3$, the housing being outwardly swelled or expanded thereabout at the forward side as at $E^4$. Penetrating such aperture, and seating upon the ledge $E^3$, is positioned a transmission housing which includes the inwardly penetrating sleeve $E^6$, the lower flange member $E^7$ seating upon the lower portion of the ledge $E^3$ and secured for example by the bolts $E^8$ and the outwardly extending housing $E^9$. The inner wall $E^{10}$ of the housing $E^9$ engages the upper portion of the ledge $E^3$ and is secured to it for example by the bolts $E^{11}$, the heads of which are enclosed within the housing, the heads of the bolts $E^8$ being external to the housing.

Within the sleeve portion $E^6$ is positioned a shaft G, mounted in ball bearings $G^1$ $G^2$, and provided at its inner end with the bevel gear $G^3$ in mesh with the bevel gear $E^1$. At the opposite end of the shaft G, within the housing $E^9$ is the bevel pinion $G^4$ in mesh with the bevel gear $G^5$ mounted on the generally vertical shaft $G^6$. Within the sleeve portion $E^6$ is positioned the tube or cylinder $E^{12}$ into the ends of which are pressed the washers $E^{13}$, the intervening space being filled with the felt ring $E^{14}$, the whole being adapted to prevent the passage of oil from the interior of the housing $E^9$ into the interior of the tractor housing $A^1$. The shaft $G^6$ rotates in the lower ball bearings $G^7$, mounted in the bottom of the housing $E^9$, and in the upper ball bearings $G^8$, mounted in the downwardly depending flange $G^9$ of the cover member $G^{10}$ of the housing $E^9$. Such cover member is upwardly and outwardly expanded as at H, to form, with the member $H^1$ secured to it, a socket member having a generally spherical inner surface. The shaft $G^6$ terminates in any suitable universal joint connection $G^{10}$ with the generally vertical shaft $G^{12}$. The shaft $G^{12}$ has at its lower end a squared portion $G^{15}$ which enters the squared opening $G^{16}$ in the upwardly extending part $G^{17}$ of the universal joint $G^{10}$ thereby forming a sliding connection with the shaft $G^6$. Surrounding such shaft $G^{12}$ is the enclosing cylindrical casing $H^2$ the lower end of which is in slidable connection with the cylindrical sleeve $H^3$ which is expanded at its end as at $H^4$ to form a spherical member in engagement with the inner spherical bearing surface of the members H, $H^1$. The casing $H^2$, in Figures 3 and 6, is shown as having a slip joint at its lower end with the sleeve $H^3$ and is yieldingly held by means of the rods R, R, which pass through lugs or ears $R^1$ $R^2$ on the sleeves $H^3$ and I respectively. Obviously the slip joint might be at either end. Springs $R^3$ $R^4$ below and above said lugs are put under tension by the nuts $R^5$ $R^6$. Screw threaded or otherwise secured to the top of the casing member $H^2$ is the generally cylindrical sleeve I, upwardly and outwardly expanded at its upper end, as at $I^1$, to form a ball member. The driving connection thus formed extends to the winch support which will next be described.

Secured to the inner side of the channel frame member $D^1$ is a short channel K. A similar channel member $K^1$ is secured to the channel frame member $D^7$ at the opposite side of the frame and a similar channel member $K^2$ is associated with the cross frame member $D^5$. It will be noted that each of these three channel members K, $K^1$, $K^2$ face inwardly. Mounted in them is the winch supporting member, generally indicated as L, which is provided with the three downwardly and outwardly projecting supporting feet $L^1$, $L^2$, $L^3$. The cross section of the three feet is similar and is indicated, as to the foot $L^1$, in Figure 5. The foot $L^1$, taken as typical of the three, terminates in an outwardly projecting portion $L^4$ adapted to penetrate between the flanges of the channel member K. It is provided with an upper generally cylindrical recess $L^5$ and a similar lower recess $L^6$, the two recesses being longitudinally off-set. The upper and lower flanges of the channel member are cut away in line with such recesses, as at $L^7$ $L^8$, to permit the insertion of the springs $L^9$ $L^{10}$ adapted to be compressed in said recesses. The outer ends of the springs engage plates $L^{11}$ and $L^{12}$ on the upper and lower flanges respectively, secured for example by the bolts $L^{14}$. The member L includes the housing M and the transverse arm $M^1$ extending across and above the tank B and terminating in the bearing $M^2$ supported by the foot $L^2$.

Referring primarily to Figure 5 it will be seen that the channel member K is secured to the frame member $D^1$ by means of the pairs of bolts $L^{20}$ $L^{21}$. The bolts $L^{20}$ also serve to position the block $L^{22}$ in the channel K, the purpose of which will later appear. It will be understood that a similar block, not herein shown, is also similarly positioned in the channel $K^1$.

Downwardly extending from the rear end of the housing M is the generally cylindrical portion $M^3$ the lower end of which, in association with the member $M^4$ secured to it, forms a spherical surfaced member engaging and surrounding the earlier described ball member $I^1$. The shaft $G^{12}$ terminates in any suitable universal joint connection $G^{14}$ enclosed by the ball and socket connection so formed, and is thereby connected to the shaft $M^5$ mounted in the sleeve $M^3$ and rotating in ball bearings $M^6$ $M^7$. It terminates at its upper end in a bevel gear $M^8$ in mesh with the bevel gear O keyed to the shaft $O^1$. Within the sleeve portion $M^3$ is positioned the tube or cylinder $M^{12}$ into the ends of which are pressed the washers $M^{13}$, the intervening space being filled with the felt ring $M^{14}$. It will be understood that the shaft $O^1$ is thus constantly driven, during rotation of the shaft E. $O^2$ diagrammatically indicates any suitable brake and clutch mechanism, the details of which form no part of the present invention and are not herein described. It will be understood however that by means of such clutch mechanism, the short shaft $O^3$ may at the will of the operator, be driven from the shaft $O^1$, $O^4$ indicates a brake and clutch operating lever in communication with the link $O^5$ adapted to actuate the clutch operating shaft $O^6$.

$O^3$ terminates in a bevel pinion P in mesh with the bevel gear $P^1$ keyed to the shaft $P^2$ which rotates in the bearing $P^3$ formed in the wall of the housing M and the above described bearing $M^2$. Keyed or otherwise secured to the shaft $P^2$ is the spool $P^4$, secured to which is the inner end of the flexible bucket guiding cable $C^3$.

It will be realized that whereas we have shown a practical and operative device nevertheless many changes might be made in the size, shape, number and disposition of parts without departing from the spirit of our invention. We therefore wish our description and drawings to be taken in a broad sense illustrative and diagrammatic rather than as limiting us to our specific showing.

The use and operation of our invention are as follows:

Our invention as herein shown is applied to a tractor employed for excavating, transporting and elevating material, although it is by no means limited to such use, but may be employed with any tractor wherewith a hoist is used. It is important, in the use of such a hoisting mechanism, that the hoist drum be generally aligned with the pulley or member over or about which the hoist cable passes, in order that the strains may be along the longitudinal axis of the tractor. It is further advantageous to have the line of hoisting strain extend along the central axis of the tractor substantially equally spaced from the sides or wheels of the tractor. We therefore position the hoist drum $P^4$ over the center of the tractor, aligned with the centrally located sheave $C^4$ on the shovel guide frame C. Since the shovel supporting frame is secured directly to the tractor, and in order to avoid the direct transmission of strains to the tractor and the power plant thereof we position the hoist drum $P^4$ and the power transmission extending from it to the tractor power plant upon a separate frame which is supported upon the tractor, but in yielding relation therewith. Thus the supporting structure in question is provided with the downwardly and outwardly extending feet $L^1$, $L^2$ and $L^3$ which penetrate the supporting channels K, $K^1$, $K^2$ upon the frame structure which supports the shovel or hoist.

The feet $L^1$ $L^2$ are aligned directly beneath the hoist shaft $P^2$. A forward hoisting strain caused by the operation of the drum $P^4$ would normally place a shearing strain upon the supporting helical springs $L^9$ $L^{10}$ and we therefore provide the blocks $L^{22}$ to take such strain and to prevent undue lateral or shearing strain against the springs. The shear is thus transmitted to the channels K $K^1$ and the frame members D, $D^7$, through the bolts $L^{21}$.

It will be noted that the three feet are disposed at the corners of a right angle triangle and that the feet $L^1$ and $L^3$ are aligned directly beneath the shaft $O^1$, and necessarily are aligned along an axis parallel with the hoisting strain although slightly laterally removed therefrom.

Thus a strain upon the cable is taken up by the yielding connection between the feet $L^1$, $L^2$ and the angles K, $K^1$, and further, by the yielding connection between the foot $L^3$ and the angle $K^2$. The flexible mounting thus provided for the winch mechanism is advantageous, particularly in that it permits the winch mechanism to adjust itself to strain and minimizes the strain upon the structural members associated with the tractor upon which the winch is mounted.

The power transmission is entirely housed, only the drum itself being exposed. This housing is shown in detail in Figure 3.

In providing a driving connection between the tractor power plant and the hoist yieldingly supported on the tractor we employ a longitudinally extensible and a flexible drive connection. Thus the shaft $G^{12}$ is made longitudinally extensible, the square end $G^{15}$ sliding in the apertured sleeve $G^{17}$, and the surrounding housing sleeve $H^2$ forms a slip joint with the sleeve $H^3$. Furthermore the shaft $G^{12}$ is connected by means of universal or ball and socket connections with the shaft $G^6$ in the housing $E^9$ on the one hand and with the shaft $M^5$ in the housing $M$ on the other, and the housing $H^2$ carries similar ball and socket connections.

In order to take off the power from the tractor, herein shown as a Fordson we employ the housing member, shown in detail at the bottom of Figure 3, which penetrates the normal aperture in the side of a Fordson tractor. The inwardly projecting sleeve $E^6$ houses the shaft $G$ provided with the bevel pinion $G^3$ in mesh with the bevel pinion $E^1$ on the shaft $E$. Thence there is a right angle connection through the bevel pinion $G^4$ and the bevel gear $G^5$ with the shaft $G^6$ in the outer portion of the housing. In order to permit the housing to be secured to the tractor body and to be positioned and removed without the removal of the tractor wheel we have made the following disposition. The outer portion $E^9$ of the housing is provided at its bottom with the flange $E^7$ which engages the lower edge of the aperture in the tractor body. The external bolts or screws $E^8$ pass through such flange and penetrate corresponding apertures in the tractor itself. The upper securing bolts $E^{11}$ on the other hand, pass through the wall of the housing proper below its top, and when the cover $G^{10}$ is in position, are concealed. By this disposition we prevent the necessity of employing any lateral or upwardly projecting flanges and the housing member fits within the bulge $E^4$ present in the Fordson tractors as manufactured. The whole apparatus can thus be applied to a Fordson tractor with no change in the tractor structure. Furthermore the housing may be applied and removed without the necessity of removing the rear tractor wheel $A^4$.

We claim:

1. The combination with a tractor of a supporting structure, mounted upon and in generally fixed relation with the tractor, including a plurality of channels, a winch support and a drum mounted thereupon, said winch support being provided with portions penetrating said channels, and yielding means tending normally to hold said penetrating portions in intermediate position between the flanges of said channels.

2. The combination with a tractor of a supporting structure, mounted upon and in generally fixed relation with the tractor, including a plurality of channels, a winch support and a drum mounted thereupon, said winch support being provided with portions penetrating said channels, each such penetrating portion being provided with a yielding member intermediate the flanges of each such channel.

3. The combination with a tractor of a supporting structure, mounted upon and in generally fixed relation with the tractor, including a plurality of channels positioned adjacent the top of said tractor, a winch support overlying said tractor and a drum mounted thereupon, said winch support being provided with a plurality of portions penetrating said channels, each such penetrating portion being provided with apertures facing the opposed flanges of such channels, and springs in said apertures compressed between said penetrating portions and the opposed flanges.

4. The combination with a tractor of a supporting structure, mounted upon and in generally fixed relation with the tractor, including a plurality of channels positioned adjacent the top of said tractor, a winch support overlying said tractor and a drum mounted thereupon, said winch support being provided with a plurality of portions penetrating said channels, each such penetrating portion being provided with apertures facing the opposed flanges of such channels, and springs in said apertures compressed between said penetrating portions and the opposed flanges, said apertures being laterally spaced.

5. The combination with a tractor of a supporting structure, mounted upon and in generally fixed relation with the tractor, including a plurality of channels positioned adjacent the top of said tractor, a winch support overlying said tractor and a drum mounted thereupon, said winch support being provided with a plurality of portions penetrating said channels, each such penetrating portion being provided with apertures facing the opposed flanges of such channels, and springs in said apertures compressed between said penetrating portions and the opposed flanges, the flanges being apertured in line with said springs and apertures and spring abutment members adapted to be secured to said flanges over said apertures.

6. The combination with a tractor of a supporting structure, mounted upon and in generally fixed relation with the tractor, including a plurality of channels, a winch support and a drum mounted thereupon, said winch support being provided with portions penetrating said channels, yielding means tending normally to hold said penetrating portions in intermediate position between the flanges of said channels, and abutment members in said channels positioned forwardly of said penetrating portions.

7. The combination with a tractor of a supporting structure, mounted upon and in generally fixed relation with the tractor, including a plurality of channels positioned adjacent the top of said tractor, a winch support overlying said tractor and a drum mounted thereupon, said winch support being provided with a plurality of portions penetrating said channels, each such penetrating portion being provided with apertures facing the opposed flanges of such channels, springs in said apertures compressed between said penetrating portions and the opposed flanges, and abutment members in said channels positioned forwardly of said penetrating portions and adapted to be engaged by said penetrating members when a forward strain is exerted upon the drum to prevent the direction of shearing strains against said springs.

8. The combination with a tractor of a supporting structure, mounted upon and in generally fixed relation with the tractor, including a plurality of channels, a winch support and a drum mounted thereupon, said winch support being provided with portions penetrating said channels, yielding means tending normally to hold said penetrating portions in intermediate position between the flanges of said channels, and means for limiting forward movement of said penetrating portions along said channels.

Signed at Streator, county of La Salle, and State of Illinois, this 29th day of June, 1926.

WILLIAM C. ANTHONY.
CHARLES H. BENEDICT.